Patented Feb. 7, 1939

2,146,155

UNITED STATES PATENT OFFICE 2,146,155

FRUIT PRODUCT AND PROCESSING

Charles C. Moore, San Francisco, Calif.

No Drawing. Application November 3, 1937,
Serial No. 172,549

3 Claims. (Cl. 99—104)

This invention relates to the process of desulphurizing fruit which has been sulphurized to withstay enzymic activity, and is an improvement on the process that is set forth in United States Patent No. 1,835,237 granted me December 8, 1931, in which patent is explained the economic necessity for the use of sulphur dioxide in making certain dried fruits such as apples, apricots, peaches, pears, etc. As described in the patent, the fruit is cut into two or more parts and immediately subjected to the fumes of sulphur preparatory to drying by exposure to natural atmospheric conditions or by exposure to artificially heated air. In this specification and appended claims, when the term "dehydrated" is used, it is understood to imply that the fruit may have been dried by either of these methods or by any suitable drying method for fruit.

In the aforesaid patent, the desirability for desulphurizing these dried fruits has been explained, and it is shown that desulphurizing is accomplished by heating the fruit, while enclosed in a suitable chamber, with an aeriform heating medium such as steam, thereafter withdrawing the steam and subjecting the fruit to vacuum conditions until its sulphur dioxide content is reduced to the desired extent. Usually, the fruit's sulphur dioxide content was reduced to about 500 parts per million, in a single treatment, and it was necessary to repeat the treatment in the instance where it was desired to have the fruit entirely free of sulphur dioxide, it being necessary if the fruit is advertised as sulphur free. It is explained in the aforesaid patent that a cycle of treatments is essential when it is desired to have the finished fruit sulphur free. Accordingly, it is obvious that an improvement wherein it is unnecessary to repeat a procedure in order to obtain a sulphur-free fruit is decidedly advantageous; and it is this improvement that constitutes my invention which invention will hereinafter be set forth.

It is known to food chemists that the greater part of the sulphur dioxide contained in dried fruit is in a combined form, principally sulphites. In the aforesaid patent, reliance is placed upon the subjection of the warm fruit to vacuum conditions for the liberating of the sulphur dioxide from its combined forms, it being known that weak sulphites break down under such treatment. As explained in the aforesaid patent, the fruit is warmed by means of a heating medium in aeriform state, such as steam, the heating medium surrounding the fruit in the chamber and permeating it. It is also known to food chemists that the chemical action of certain acids such as phosphoric, hydrochloric, etc., on sulphites is the liberation of sulphur dioxide, the acid substituting for the liberated sulphur dioxide. In fact, the official procedure for the analytical determination of sulphur dioxide in dried fruit comprises the addition of a small amount of either phosphoric or hydrochloric acid to the macerated fruit digested in ten times the fruit's weight of water for the purpose of liberating the sulphur dioxide from its combined forms. It is the improved and new application of the chemical action that certain acids have on sulphites, in conjunction with the process for desulphurizing fruit as set forth in the aforesaid patent, that constitutes my improvement. I do not confine myself to any particular acid for such liberation of sulphur dioxide. Obviously, there are several ways in which a reagent such as an acid may be applied to the fruit; it may be injected into the steam or other aeriform heating medium that is used to heat the fruit, in which case the acid fumes mix with the steam and permeate the fruit; the acid may be placed in a suitable receptacle and placed in a suitable position in the chamber so it will vaporize and its vapors mix with the steam and permate the fruit. Only a small amount of acid is needed in the fruit because of the small amount of the sulphites contained therein, the acid combining with the base from which the sulphur dioxide has been liberated. Any excess of acid will be in a free state and will escape from the fruit under the vacuum conditions that subsequently prevail. It is true that when fruit is subjected to the heating and acid treatment above suggested, then dried under suitable drying conditions other than in vacuo, the fruit will not retain the liberated sulphur dioxide, nor will it retain the free acid; drying in vacuo is preferable because it not only expedites the chemical reaction for liberating sulphur dioxide, it lends to improvement in the color of the finished fruit. It is also known to food chemists that the residual amount of phosphites left in the fruit, in the instance where phosphoric acid has been used to liberate the sulphur dioxide from its combined forms, is a beneficial substance, a very desirable constituent of a food product even though in but a small amount.

A practical illustration of my improvement in desulphurizing consists in placing the dehydrated fruit in trays that are ricked in a suitable chamber, the chamber having a vacuum-line connection a steam-line connection, and a steam-discharge connection. In the steam-line pipe, between its valve and its opening into the chamber, is a cock through which acid can be introduced into the pipe line, the acid being vaporized and discharged into the chamber when the valve in the steam-line connection is opened, whereupon the acid vapor mixes with the steam and permeates the pieces of fruit. The steam is allowed to enter the chamber until there is obtained a gauge reading of about 15 pounds pressure which pressure is maintained for a short period of time, the steam being allowed to discharge before the fruit has absorbed sufficient heat to cause inversion of its fruit sugars. The pressure in the chamber is then gradually reduced by gradually opening the valve in the vacuum-line connection, vacuum conditions being maintained until the fruit is suitably dry, such as a moisture content of about 25 percent. As is obvious, under such treatment, the liberated sulphur-dioxide gas and any free acid vapor are withdrawn from the fruit as the moisture vapor is withdrawn. This steam treatment of the fruit greatly increases the moisture content of the fruit, usually to about 45 percent. If the moisture content of the finished fruit is to be about 25 percent, about 44 percent of the moisture content existing in the fruit is to be vaporized. It is during the withdrawal of this excessive moisture that the liberated sulphur dioxide and any free acid vapor is withdrawn from the fruit. The gradual reduction of pressure in the chamber, above mentioned, is not a requisite in the removal of sulphur dioxide or acid vapor from the fruit; it is to provide against an excessive distending of the pieces of fruit as results when there is internal pressure existing in the fruit and the external pressure is rapidly lowered.

From the foregoing, it is seen that my improvement resides in supplying dehydrated fruit with a chemical reagent that serves to liberate sulphur from the combined form or forms in which sulphur exists in certain dehydrated fruits; the supplied chemical reagent, in accordance with the usual chemical reactions, substituting for the liberated, gaseous sulphur-compound that is free to escape from the fruit. While, by way of illustration, I have cited the use of such chemical reagents as phosphoric acid and hydrochloric acid, I do not confine myself to these chemical reagents for the purpose in view. The different factors in my improved process may be varied in degree, and substitutions may be made without departing from the basic principles I have described. It is, therefore, to be understood that my invention is not confined to the details disclosed but includes all departures therefrom falling within the terms of the appended claims.

The phrase, "suitable form of dehydrated fruit," as used in the appended claims, implies any form in which dehydrated fruit may be existing such as; whole fruit, pieces, etc. The term "sulphurized", as used in the claims, implies that the fresh fruit was subjected to the fumes of sulphur before it was subjected to drying, or that the dried fruit was subjected to sulphur fumes for the purpose of destroying any insect or larva that may be in it. The term, "desulphurized", as used in the claims, implies that the sulphur compound that was imparted to the fruit through "sulphurizing" it is removed either completely or to a great extent, resulting in a finished product similar in general appearance to that of the dehydrated fruit before it is subjected to the process for desulphurizing it.

What I claim is:

1. The process of desulphurizing fruit which has been sulphurized to withstay enzymic activity, which consists in heating the sulphurized fruit, while enclosed in a vacuum chamber, by bringing an acidified gaseous heating medium into contact therewith, and thereafter withdrawing such medium and subjecting the fruit to vacuum conditions until the sulphur dioxide content of the fruit is reduced to a desired extent.

2. The process of desulphurizing fruit which has been sulphurized to withstay enzymic activity, which consists in heating the sulphurized fruit, while enclosed in a chamber and under pressure, by bringing an acidified gaseous heating medium into contact therewith, and thereafter withdrawing such medium and subjecting the fruit to vacuum conditions until the sulphur dioxide content of the fruit is reduced to a desired extent.

3. The process of desulphurizing fruit which has been sulphurized to withstay enzymic activity, which consists in heating the sulphurized fruit, while enclosed in a vacuum chamber, by bringing acidified steam into contact therewith, and thereafter withdrawing the acidified steam and subjecting the fruit to vacuum conditions until the sulphur dioxide content of the fruit is reduced to a desired extent.

CHARLES C. MOORE.